United States Patent [19]
Reed et al.

[11] Patent Number: 5,396,568
[45] Date of Patent: Mar. 7, 1995

[54] TEMPERATURE COMPENSATION FOR FIBER OPTIC SENSORS

[75] Inventors: Stuart E. Reed, Homeworth; John W. Berthold, Salem, both of Ohio

[73] Assignee: The Babcock & Wilcox Company, New Orleans, La.

[21] Appl. No.: 124,916

[22] Filed: Sep. 22, 1993

[51] Int. Cl.[6] .............................................. G02B 6/26
[52] U.S. Cl. .................... 385/13; 250/227.16; 250/227.23; 356/349; 385/32
[58] Field of Search .................... 385/12, 13, 25, 31, 385/32, 39; 250/227.14–227.16, 227.23–227.25; 356/345, 349, 357, 358

[56] References Cited

U.S. PATENT DOCUMENTS

| | | | |
|---|---|---|---|
| 4,421,979 | 12/1983 | Asawa et al. | 385/32 X |
| 4,436,995 | 3/1984 | Whitten | 385/32 X |
| 4,557,550 | 12/1985 | Beals et al. | 385/32 |
| 4,648,280 | 3/1987 | Miyoshi et al. | 73/861.24 |
| 4,679,425 | 7/1987 | Bolland | 73/49.2 |
| 4,898,442 | 2/1990 | Scanlan et al. | 385/32 |
| 4,932,262 | 6/1990 | Wlodarczyk | 73/705 |
| 4,932,263 | 6/1990 | Wlodarczyk | 73/705 |
| 5,020,379 | 6/1991 | Berthold et al. | 73/800 |
| 5,196,694 | 3/1993 | Berthold et al. | 250/227.16 |
| 5,258,614 | 11/1993 | Kidwell et al. | 250/227.16 |
| 5,291,015 | 3/1994 | Senior et al. | 250/227.23 |

OTHER PUBLICATIONS

"Fiber Optic Total Pressure Sensors," RDD-93:403-00-001-001:01; prepared for McDonnell Douglas Corp., Oct. 23, 1992.

"Prototype Fiber Optic Pressure Detector System," Berthold et al. prepared for GE Co., May 1992.

Primary Examiner—John D. Lee
Attorney, Agent, or Firm—Daniel S. Kalka; Robert J. Edwards

[57] ABSTRACT

A method for achieving thermal compensation of a microbend sensor used in a fiber optic system and exposed to a thermal environment comprises providing a length of optical fiber and a light source at the optical fiber for passing light through the fiber. A detector is provided at the optical fiber for detecting the light passed through the fiber. A section of the fiber is split for establishing an active leg and a reference leg. An active microbend sensor is provided on the active leg in a thermal environment for producing an active signal; and a reference microbend sensor is provided on the reference leg in the thermal environment near the active sensor for producing a reference signal. The active signal and the reference signal are then detected and a compensation for the active sensor is determined based on the active signal and the reference signal.

13 Claims, 3 Drawing Sheets

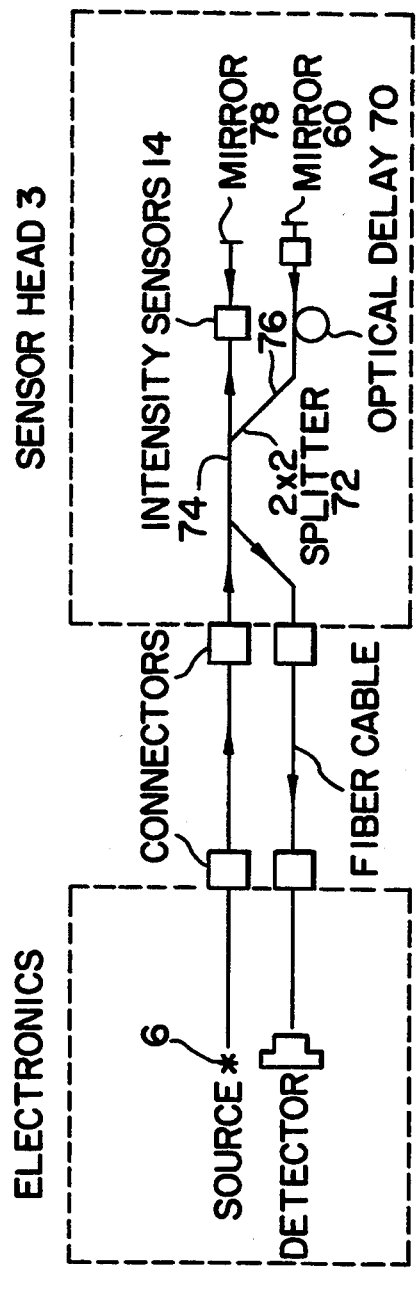
FIG.4
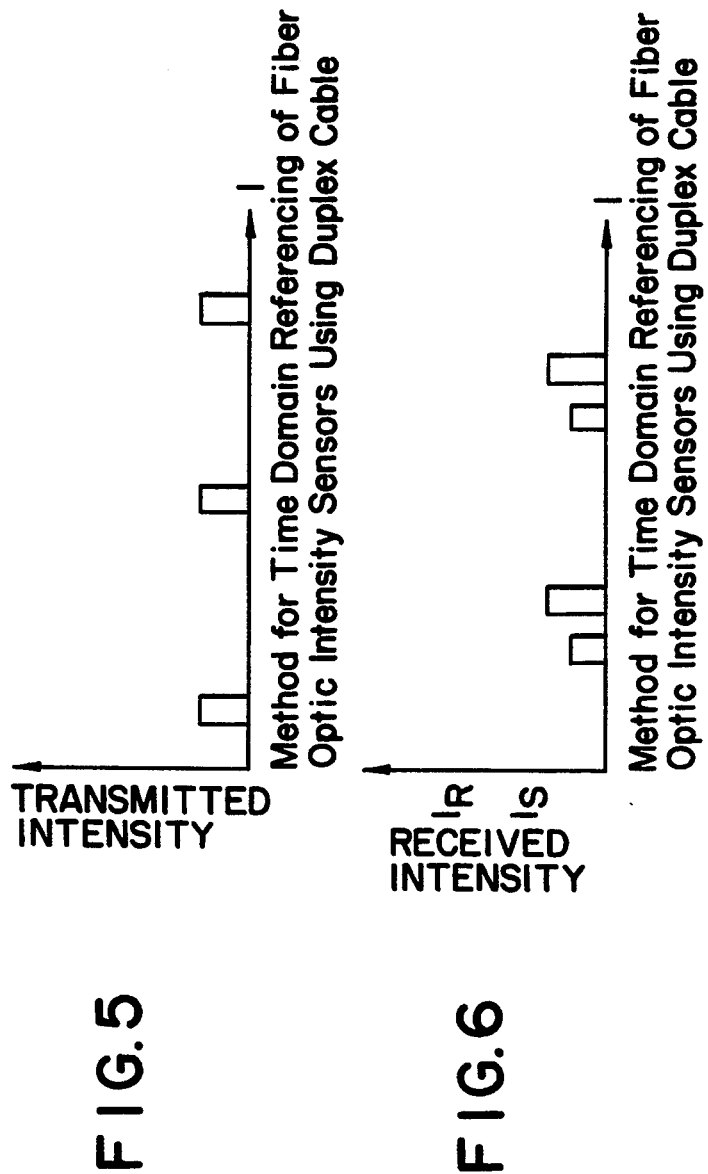
FIG.5
FIG.6

TEMPERATURE COMPENSATION FOR FIBER OPTIC SENSORS

BACKGROUND OF THE INVENTION

1. Field of Invention

The present invention relates in general to fiber optic sensors and in particular to a new and useful method and system for providing temperature compensation for a fiber optic sensor.

2. Description of Related Art

Microbending of optical fibers provides a simple and straightforward means of transduction, through intensity modulation for a wide variety of static and dynamic sensor types, such as pressure transducers, strain gages, accelerometers, and displacement transducers. Because these sensors use analog intensity modulation, for accuracy, they must be compensated for any undesired variables which produce changes in the launched light intensity, including cable and connector effects, vibration and temperature. Vibration, cable and connector effects are generally compensated through the use of multiplexed optical architectures either in the wavelength domain or the time domain. In these architectures, the total signal includes a reference component which is modulated by the error components only and an active component which is modulated by both the measurand and the error components. The relative amplitudes of these two components are then used in the signal processing to determine the magnitude of the desired measurand.

Presently, there is no known system or method which provides for temperature compensation for a fiber optic system sensor in a simple and efficient manner.

SUMMARY OF THE INVENTION

The present invention pertains to a method for achieving thermal compensation of a microbend sensor used in a fiber optic system in which the sensor is exposed to a thermal environment. The method, according to the present invention, comprises providing a length of optical fiber and a light source at the optical fiber for passing light through the optical fiber. Detection means are also provided at the optical fiber for detecting the light which is passed through the fiber. A portion of the optical signal is split e.g. in the power, wavelength or time domain, in order to establish an active leg and a reference leg of the fiber. An active microbend sensor is provided on the active leg in a thermal environment for producing an active signal. A reference microbend sensor is provided on the reference leg of the fiber in the same thermal environment as the active sensor, and near the active sensor in order to produce a reference signal. The detection means then detects the active signal produced by the active sensor and the reference signal produced by the reference sensor. Finally, a compensation for the active microbend sensor is determined based on the active signal and the reference signal.

The present invention also pertains to a fiber optic system which allows for thermal compensation of an active microbend sensor. The system comprises a light source, a length of optical fiber communicating with the light source in order to pass light through the fiber and power, wavelength or time domain splitting means. The optical fiber has an active leg and a reference leg at a location in the length of the fiber. Detection means are used to detect the light passed through the fiber. An active microbend sensor is located on the active leg for producing an active signal; and a reference microbend sensor is located on the reference leg for producing a reference signal. The reference sensor is positioned near the active microbend sensor for experiencing the same thermal environment experienced by the active sensor. Process means communicates with the detection means in order to determine a compensation for the active microbend sensor based on the active signal and the reference signal.

In accordance with the present invention, a sensor for microbending an optical fiber comprises a frame having a body, a bottom and an open area within the body as well as an aperture through the body near the bottom for passing an optical fiber through the body and across the bottom. A block is movably mounted to the body of the frame in the open area; and the block is engageable with the bottom of the frame for compressing the optical fiber. Adjustment means are used for adjusting the movement of the block within the frame.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4 is a schematic view of a fiber optic microbend sensor system used in conjunction with the present invention;

FIG. 5 is a graph plotting transmitted intensity versus time for the system for FIG. 4; and FIG. 6 is a graph plotting the received intensity versus time for the system of FIG. 4.

DESCRIPTION OF THE PREFERRED EMBODIMENTS

Figure 1:
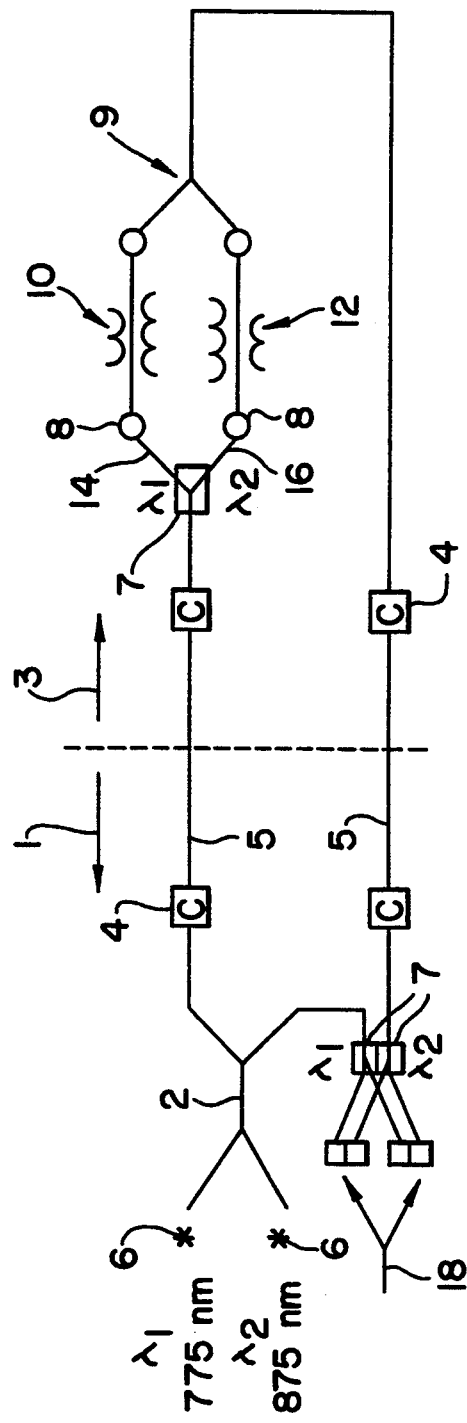
FIG. 1 is a schematic view of a system according to the present invention.

The present invention pertains to a fiber optic system having a microbend sensor which is exposed to a thermal environment. The system according to the present invention comprises two light sources 6 at different wavelengths communicating with an optical coupler 2 and an optical fiber 5. The optical fiber 5 is provided in sections wherein each section is connected by a connector 4. The system according to the present invention has a signal section 1 which comprises the light source 6, bi-cell detectors 18 and wavelength division multiplexers (WDMs) 7. The bi-cell detectors 18 are connected by WDMs 7 to the optical coupler 2 and optical fiber 5. The system also comprises a sensor/transducer section 3 comprising a WDM 7, an active leg 14 and a reference leg 16 which is split from the optical fiber 5 using a WDM 7. The split sections 14 and 16 are reattached after modulation as one fiber by a combiner 9. A plurality of fusion splices 8 are also used on the legs 14 and 16. The connection from optical coupler 2 through WDM 7 to half of each bi-cell detector 18 provides a means to compensate for brightness variations of the sources 6. The connection from signal fiber 5 through WDM 7 to the other half of the bi-cell detectors 18 provides a means to compensate the active signal at a first wavelength using a reference signal at a second wavelength.

An active microbend sensor 10 is provided on the active leg 14 and a reference microbend sensor 12 is provided on the reference leg 16. The reference sensor 12 is located near the active sensor 10 for experiencing the same thermal environment which is experienced by the active sensor 10. The active sensor 10 produces an active signal and the reference sensor 12 produces a reference signal by microbending each leg of the fiber respectively, which is in turn, transmitted to the bi-cell detectors 18.

Figure 2:
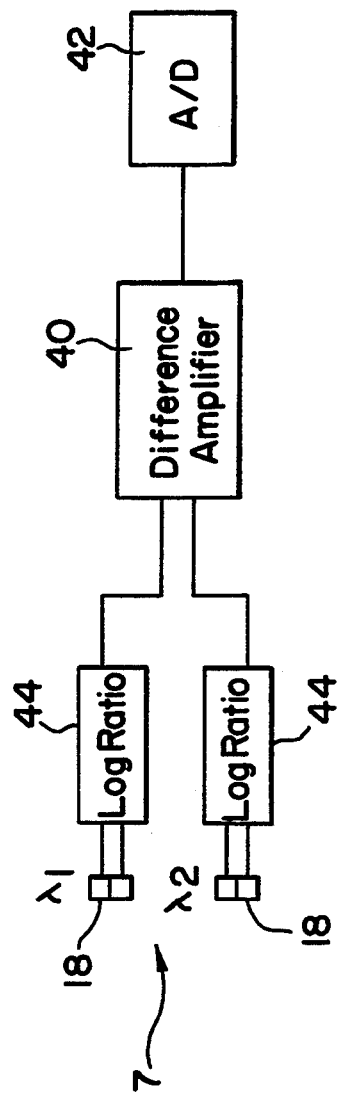
FIG. 2 is a schematic view of a signal process circuit used in conjunction with the system of FIG. 1.

FIG. 2 illustrates a signal process circuit 7 for the bi-cells 18 (FIG. 1). The bi-cells 18 communicate with a log ratio function unit 44 respectively, and in turn, each unit 44 is connected to a difference amplifier unit 40. The log ratio function units 44 provide brightness compensated signal outputs for the active and reference wavelengths. The difference amplifier provides a second level of ratiometric compensation to achieve the desired compensation of the measurand for brightness, thermal, vibration and insertion loss variations. The difference amplifier unit 40 is in turn connected to an analog-to-digital converter 42. The signal process unit 7 uses the active signal and the reference signal sent to the bi-cells 18 for processing purposes for performing various functions such as ratio-metric and/or sum-difference functions which automatically provides the thermal compensation needed for the active sensor 10 in order to be accommodated for thermal offsets.

Figure 3:
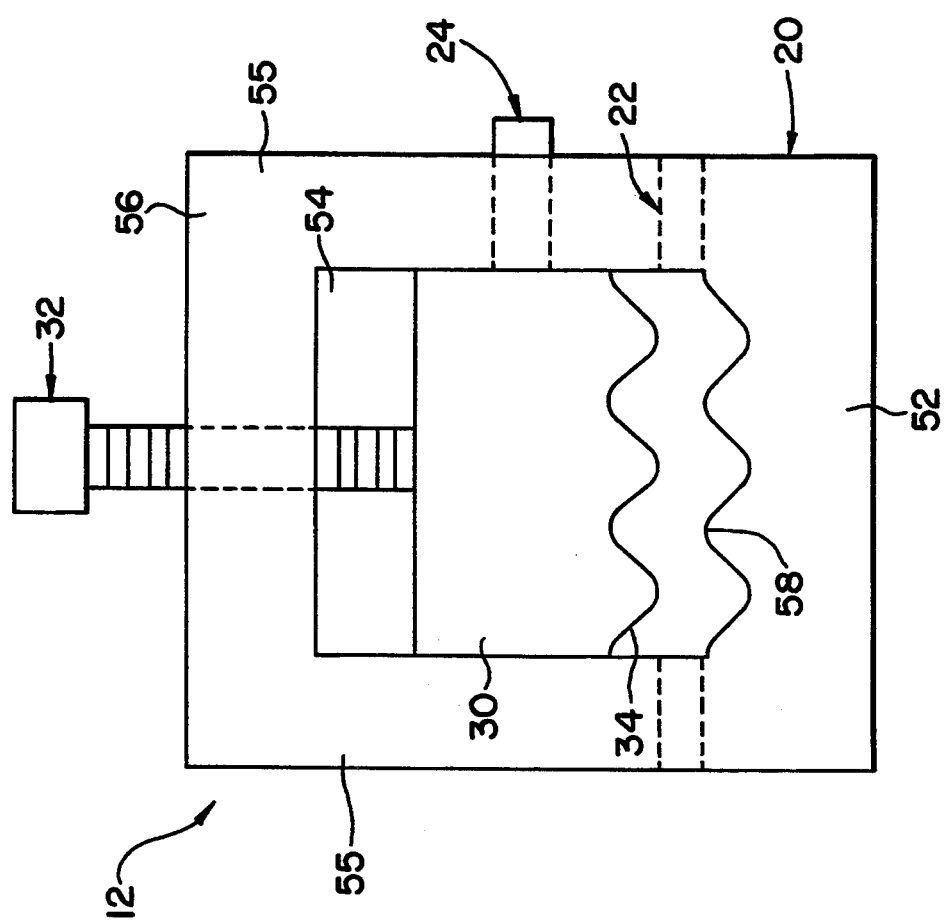
FIG. 3 is a schematic view of a reference sensor according to the present invention.

FIG. 3 shows the reference sensor 12 comprising a frame 20 having a top 56, a bottom 52 and sides 55. A space 54 is located between the sides 55 for receiving a movable tooth block 30. An aperture 22 is provided in the frame 20 through both sides 55 near the bottom 52. The aperture 22 receives an optical fiber 16 (FIG. 1) such that the fiber 2 is channeled across the bottom 52 of the frame 20. The tooth block 30 is controlled by an adjuster 32 which extends through the top 56 of the frame 20.

The bottom 52 of the frame 20 has a plurality of teeth 58. The block 30 also has a plurality of teeth 34 which are configured in order to engage with the teeth 58 of the bottom 52. Thus, the fiber 16 (FIG. 1) is compressed by the movable block 30 by engaging the teeth 34 of the block 30 with the teeth 58 of the bottom 52 which, in turn, causes the fiber 16 (FIG. 1) to experience microbending.

Additionally, a side-screw 24 is provided through a side 55 for locking the tooth block 30. The adjuster 32 can be an adjustable screw.

The present invention comprises both a method and system for achieving thermal compensation of a fiber optic microbend sensor 10 (FIG. 1). The thermal offsets in a microbend sensor 10 result from the thermal expansion of the structural components of the sensor 10 and from the temperature induced changes in the optical properties of the optical fiber 16.

As shown in FIG. 3, the frame 20 of the sensor 12 is a fixed frame, which is not modulated by a measurand, and a set of microbend teeth 58 at the bottom 52 of the frame 20. The reference sensor 12 and the active sensor 10 (FIG. 1) are preferably made of the same configuration and of the same material. It is also preferable that the teeth of the sensor 12 have the same pitch, shape and depth as the teeth of the active sensor 10.

As illustrated in FIG. 1; by positioning the reference sensor 12 near the active sensor 10, the reference sensor 12 is exposed to the same thermal environment as experienced by the active microbend sensor 10. The reference sensor 12 can not only be positioned near the active sensor 10 but also positioned in or on the active sensor 10 for exposure to the same thermal environment.

By using the same optical fiber for the reference leg 16 and the active leg 14, as well as the same structural materials for both the active sensor 10 and the reference sensor 12, the modulation of the reference fiber leg 16 due to the thermal expansion and optical property changes is the same as the modulation experienced by the active fiber leg 14.

When the active signal and the reference signal are processed by the signal process circuit 7 (FIG. 2), using ratio-metric and/or sum-difference techniques, in order to compensate for cable motion and connector effects, the desired temperature compensation is achieved without additional components or signal processing.

The compensation element, namely the reference sensor 12, and its insertion loss are placed in the reference leg 16. The insertion loss of the reference toothset 12 is generally comparable to that of the active sensor 10, thus making the loss budgets for the active leg 14 and reference leg 16 nearly the same and the signal levels approximately equal. This provides an improved overall signal to noise ratio, and therefore better resolution, for some types of opto-electronics, such as a wavelength division multiplexed system using dispersive elements and array detectors.

The compensation element 12 uses the same overall loss mechanism, i.e. microbend, as the active fiber 14 and reference fiber 16. This minimizes the effects of differential modal fill on the performance of the temperature compensation. It also insures that the effects of cable bending and connector losses in the return fiber affect the active and reference signals equally, maintaining good compensation for these variables as well.

The slope of the thermal offset (dB/degree) of a microbend sensor 10 is a function of the preload on the fiber 16. The slope of the thermal compensation can be simply adjusted to the desired value by adjusting the preload on the toothblock 30 (FIG. 3). In normal use, the preload is set by loading the moveable toothblock 30 with the adjuster screw 32, differential screw or load rod from the end 56 of the frame 20. The movable block 30 is then locked in place with the side-screw 24 which is tipped with a hardened ball. This construction is highly resistant to shock and vibration, as well as spurious thermal motions once the side-screw 24 is locked in place.

A time domain referencing alternate embodiment is depicted in FIG. 4. Light from a pulsed source 6 is transmitted to a sensor head 3 containing two fiber optic intensity sensors 14 such as a microbend pressure sensor, delay coil 70 and 2×2 power splitter 72. Each input light pulse is divided at the splitter 72 between the sensor tap 74 and the delay coil tap 76 acting as the reference fiber. The ends of the taps are mirrored 78, 60. If the round trip time through the delay coil 70 is long enough, the received light pulses from the sensor, $I_S$, and delay coil, $I_R$, will be separated in time as shown in FIGS. 5 and 6. Any cable bending or connector mating and demating introduce offsets which affect the received pulses similarly. Thus, a ratiometric measurement $I_S/I_R$ provides an output signal free of errors due to fluctuations in the average light level from the source.

Specific embodiments of the invention have been shown and described in detail to illustrate the application of the principles of the invention, it will be understood that the invention may be embodied otherwise without departing from such principles.

What is claimed is:

1. A method for achieving thermal compensation of a microbend sensor used in a fiber optic system and exposed to a thermal environment, the method comprising the steps of:

providing a length of optical fiber;

providing two light sources at the optical fiber for passing light at two different wavelengths through the optical fiber;

providing detection means at the optical fiber for detecting the light at the two different wavelengths passed through the optical fiber;

splitting a section of the optical fiber for establishing an active leg of the fiber with the active leg receiving light at a first wavelength and a reference leg of the fiber with the reference leg receiving light at a second wavelength;

providing an active microbend sensor on the active leg of the fiber in a thermal environment producing an active signal;

providing a reference microbend sensor on the reference leg of the fiber in the thermal environment near the active sensor for producing a reference signal;

detecting the active signal produced by the active microbend sensor and detecting the reference signal produced by the reference microbend sensor; and determining a compensation for the active microbend sensor based on the active signal and the reference signal.

2. The method according to claim 1, including adjusting a setting of the active microbend sensor based on the determined compensation.

3. The method according to claim 1, including combining the section of the optical fiber at a location after the active microbend sensor and the reference microbend sensor.

4. The method according to claim 1, including providing the active microbend sensor of a configuration and providing the reference microbend sensor of the configuration of the active microbend sensor.

5. The method according to claim 4, including providing the active microbend sensor of a material and providing the reference microbend sensor of the material of the active microbend sensor.

6. A fiber optic system comprising:

two light sources for providing light at two different wavelengths;

a length of optical fiber communicating with the light sources for passing light at two different wavelengths through the optical fiber, the length of optical fiber having an active leg receiving light at a first wavelength and a reference leg receiving light at a second wavelength at a location in the length of fiber;

detection means for detecting the light passed at two different wavelengths through the optical fiber;

an active microbend sensor on the active leg of the optical fiber for producing an active signal;

a reference microbend sensor on the reference leg of the optical fiber for producing a reference signal the reference sensor being positioned near the active microbend sensor;

the active signal and the reference signal being provided to the detection means; and process means communicating with the detection means for determining a compensation for the active microbend sensor based on the active signal and the reference signal.

7. The system according to claim 6, wherein the active sensor is made of a configuration and the reference sensor is made of the configuration of the active sensor.

8. The system according to claim 7, wherein the active sensor is made of a material and the reference sensor is made of the material of the active sensor.

9. A sensor for microbending an optical fiber, the sensor comprising;

a frame having a top, a bottom, and sides with an open area within the frame, the frame also having a first aperture through the frame near the bottom for passing an optical fiber through the frame across the bottom;

a block movably mounted within the frame in the open area, the block being engageable with the bottom of the frame for compressing the optical fiber;

an adjuster for controlling the movement of the block, the adjuster extending through the top of the frame and being connected to the block; and means for locking the block in position, the locking means extending through a second aperture in the frame.

10. The sensor according to claim 9, wherein the bottom comprises a toothed surface.

11. The sensor according to claim 10, wherein the block comprises a toothed surface engageable with the toothed surface of the bottom.

12. The sensor according to claim 9, wherein the adjuster comprises an adjustable screw.

13. The sensor according to claim 9, wherein the locking means comprises a side-screw connected to a side of the block.

* * * * *